US009909681B2

(12) United States Patent
Nebel et al.

(10) Patent No.: US 9,909,681 B2
(45) Date of Patent: Mar. 6, 2018

(54) DIAPHRAGM ACTUATOR FOR A CONTROL VALVE

(71) Applicant: SAMSON AG, Frankfurt am Main (DE)

(72) Inventors: Eugen Nebel, Nidderau (DE); Michael Siegert, Wiesbaden (DE); Janusz Koinke, Obershausen (DE)

(73) Assignee: SAMSON AG (DE)

( * ) Notice: Subject to any disclaimer, the term of this patent is extended or adjusted under 35 U.S.C. 154(b) by 0 days.

(21) Appl. No.: 14/976,934

(22) Filed: Dec. 21, 2015

(65) Prior Publication Data
US 2016/0186886 A1    Jun. 30, 2016

(30) Foreign Application Priority Data
Dec. 22, 2014 (DE) .......... 10 2014 119 387

(51) Int. Cl.
*F16K 31/126* (2006.01)
*F15B 15/10* (2006.01)
*G05D 16/06* (2006.01)

(52) U.S. Cl.
CPC .......... *F16K 31/1262* (2013.01); *F15B 15/10* (2013.01); *G05D 16/0661* (2013.01); *F15B 2211/30* (2013.01)

(58) Field of Classification Search
CPC ............ F16K 31/1262; F16K 31/1264; G05D 16/0661; F15B 15/10; F15B 2211/30
See application file for complete search history.

(56) References Cited

U.S. PATENT DOCUMENTS

| 2,934,305 A | 4/1960 | Farris et al. |
| 3,613,513 A | 10/1971 | Johnson |
| 3,618,473 A * | 11/1971 | Miller ............... F15B 15/10 |
| | | 92/130 R |

(Continued)

FOREIGN PATENT DOCUMENTS

| CA | 927696 A | 6/1973 |
| CA | 1144438 A | 4/1983 |

(Continued)

OTHER PUBLICATIONS

Machine Translation for DE 4305631 A1.*

(Continued)

*Primary Examiner* — Ian Paquette
(74) *Attorney, Agent, or Firm* — Ware, Fressola, Maguire & Barber LLP

(57) ABSTRACT

A diaphragm actuator (10, 40) for a control valve is shown including an actuator housing (12, 42), in which a diaphragm (14, 44) including a diaphragm disk (16, 46) is sealingly fitted thus forming a pressure chamber (20, 50), and furthermore at least one spring (24, 54) is provided which rests against the diaphragm disk (16, 46) and the actuator housing (12, 42), with the diaphragm disk (16, 46) being connected to a valve stem (22, 52) for actuating a valve body. At least two springs (26, 56) are provided and are disposed one after another in an axial direction between the actuator housing (12, 42) and the diaphragm disk (16, 46), with a spring seat element (28, 58) linearly guided by at least one linear guiding element (30, 60) being provided between the at least two springs (26, 56).

13 Claims, 3 Drawing Sheets

(56) References Cited

U.S. PATENT DOCUMENTS

| | | | |
|---|---|---|---|
| 3,630,093 A | 12/1971 | Morse et al. | |
| 3,762,280 A * | 10/1973 | Kreuter | F15B 15/10 |
| | | | 74/522 |
| 3,936,919 A | 2/1976 | Genbauffe | |
| 4,378,932 A * | 4/1983 | Avery | F16K 31/1262 |
| | | | 251/285 |
| 4,783,046 A * | 11/1988 | Young | F16K 31/1262 |
| | | | 251/61 |
| 5,487,273 A * | 1/1996 | Elpern | F15B 15/10 |
| | | | 137/489.5 |
| 2014/0260949 A1 * | 9/2014 | Ho | B60G 17/005 |
| | | | 91/368 |

FOREIGN PATENT DOCUMENTS

| | | |
|---|---|---|
| CA | 2077280 A1 | 3/1993 |
| DE | 10 68 974 B | 10/1959 |
| DE | 21 01 893 A1 | 7/1971 |
| DE | 20 58 688 A1 | 8/1971 |
| DE | 1 920 990 C | 3/1973 |
| DE | 30 28 937 A1 | 2/1981 |
| DE | 41 31 708 C1 | 4/1993 |
| DE | 4305631 A1 * | 8/1994 ............. F15B 15/10 |
| DE | 10 2008 032 676 A1 | 1/2010 |
| EP | 2 028 377 A2 | 2/2009 |
| GB | 2 077 393 | 12/1981 |
| GB | 2 118 329 | 10/1983 |
| JP | H09 68205 A | 3/1997 |
| WO | 2008/112434 A1 | 9/2008 |

OTHER PUBLICATIONS

European Search Report dated Jun. 5, 2016 for EP 15 20 1983, including eight document citations, search strategy, examination, and English Abstract of JP H09 68205, 9 pages.
Bibliographic Data for Document DE 10 2008 032 676, including English Abstract, 2 pages.
Bibliographic Data for Document EP 2 028 377 A2, including English Abstract, 2 pages.
Examination Report from the German Patent Office for the priority application No. DE 10 2014 119 387.3, 5 pages.
Machine translation of NPL, 8 pages.

* cited by examiner

DIAPHRAGM ACTUATOR FOR A CONTROL VALVE

BACKGROUND OF THE INVENTION

The invention relates to a diaphragm actuator of a control valve as specified in the preamble of claim 1.

Generic diaphragm actuators are known from U.S. Pat. No. 3,936,919, for example, and international patent WO 2008/112434 A1 in particular discloses a serial arrangement of springs in a diaphragm actuator. German patent document DE 10 2008 032 676 A1 discloses an expansion valve which has a gas permanently enclosed in a pressure chamber therein.

European patent document EP 2 028 377 A2 relates to a diaphragm actuator for actuating a control valve. This prior art diaphragm actuator comprises an actuator housing in which a diaphragm having a diaphragm disk is sealingly fitted in the actuator housing. A pressure chamber is thus formed, wherein application of pressure to the diaphragm will cause at least one spring which is provided therein and rests against the diaphragm disk and the actuator housing to be compressed, which diaphragm actuator is connected to a valve stem for actuating a valve body. It is also possible to have a plurality of springs arranged in parallel acting between the actuator housing and the connecting element.

Such arrangement is disadvantageous in that—if only one spring is connected in series—such spring may be prone to buckling if the valve stem travel is long. One measure to prevent the spring from buckling is to increase its outer diameter. However, this will have an adverse effect on the setting options of the spring parameters acting on the diaphragm disk.

BRIEF SUMMARY OF THE INVENTION

It is the object of the invention to provide a diaphragm actuator which allows greater adaptability of the spring characteristics.

This object is accomplished in a diaphragm actuator for a control valve comprising an actuator housing in which a diaphragm including a diaphragm disk is sealingly fitted in the actuator housing, thus forming a pressure chamber, and furthermore at least one spring is provided which rests against the diaphragm disk and the actuator housing, with the diaphragm disk connected to a valve stem for actuating a valve body, by providing at least two springs disposed the one after the other in an axial direction between the actuator housing and the diaphragm disk, with a spring seat element linearly guided by at least one linear guiding element provided between the at least two springs.

Advantageous embodiments are briefly described below.

The linear guiding element may be attached to the actuator housing, to the diaphragm disk, or to both.

The linear guiding element may comprise a telescopic rod.

The spring seat element may be in the form of a ring element, with the valve stem projecting through a central opening provided in the ring element.

The spring seat element may be assigned to one linear guiding element each.

The spring seat element may be connected to a linear guiding element via a sliding bush.

The spring seat element may be connected to a first part of a telescopic rod via a sliding bush, with a second part of the telescopic rod being adapted to be slidingly inserted in the first part.

The actuator housing may comprise a top part and a bottom part, which parts have been adjusted in their extension to the length of a first spring, with an intermediate part being moreover provided whose axial extension corresponds to the sum of the lengths of at least one second spring arranged in series relative to said first spring.

As described above, a diaphragm actuator for a control valve comprises an actuator housing in which a diaphragm including a diaphragm disk is sealingly fitted, thus forming a pressure chamber for moving the diaphragm, and furthermore, at least one spring is provided which rests against the diaphragm disk and the actuator housing, the diaphragm disk being connected to a valve stem for actuating a valve body.

According to the invention, at least two springs are provided the one behind the other in an axial direction between the actuator housing and the diaphragm disk, with a linearly guided spring seat element being disposed between the springs.

The linearly guided spring seat element allows the use of two springs which are relatively short compared to their outer diameter, in order to yield appropriate spring characteristics, and which have been improved with regard to buckling.

As mentioned, the linear guide may be attached to the actuator housing, the diaphragm disk, or both.

Attaching the linear guide to both the diaphragm disk and the actuator housing has the advantage that this will additionally protect the diaphragm from becoming warped and thus result in the springs being more evenly loaded.

It is also possible to have a plurality of spring seat elements guided by linear guiding elements. More specifically, such elements will be arranged so as to be equally spaced from the valve stem axis.

In yet another preferred embodiment of the invention, the linear guiding elements, in particular linear guiding rods, may extend coaxially relative to at least one spring. It is also possible to use a plurality of coaxially mounted springs having different outer diameters so as to provide desired spring characteristics.

In a particularly simple design of a linear guide, the spring seat element may be connected to at least one guide rod via a least one sliding bush. The guide rod may either be attached to the diaphragm disk or to the actuator housing, with the guide rod being shorter in length than the axial extension from the diaphragm disk to the opposite actuator housing in an unpressurized state thereof.

In an embodiment which is considered particularly advantageous, the linear guide may take the form of a telescopic guide. This allows the actuator housing to be connected to the diaphragm disk and still ensures travel over the entire travel distance.

Preferably, the spring seat element may be connected to a first portion of a telescopic rod via a sliding bush into which a second portion of said telescopic rod can be slidingly inserted.

This prevents the diaphragm and the spring seat element from being twisted with respect to the actuator housing.

In yet another embodiment of the invention, a mixture of both telescopic guides and guide rods may be used.

Preferably, pressure springs may be used. As a result, the diaphragm will thus fluidically separate a pressure chamber from a spring chamber. The pressure prevailing in the pressure chamber will then counteract the spring force so as to move the valve.

When pressure springs are used in a control valve which is open in an unpressurized state thereof, its valve stem will extend through the spring chamber.

Each linear guiding element may thus have a single spring seat element assigned to it, or a plurality of linear guiding elements distributed along the circumference may be guided by means of a ring-shaped element, in particular a single such element. Said ring element may then comprise several individual spring seat elements that are connected to each other.

In this case, the spring seat element may preferably be formed as a ring element, with the valve stem extending through its central opening.

A central sleeve may be provided around the valve stem which sleeve—at a predefined stroke level—will provide a stop for the diaphragm disk, thus implementing a stroke limitation.

The linear guiding elements may be designed so as to act as stroke limiters. Guide rods may for example act as stops on an opposite part of the housing, or the telescopic guides may be fitted with corresponding stops.

According to another preferred embodiment of the invention, the actuator housing comprises a top part and a bottom part which—in their total axial length—are adjusted to the length of a spring. Moreover, an intermediate part is provided whose axial extension corresponds to the sum of the lengths of the serial springs introduced in addition to the first spring.

Additional advantages, features and possible applications of the present invention may be gathered from the description which follows, in which reference is made to the embodiments illustrated in the drawings.

Throughout the description, claims and drawings, those terms and associated reference signs are used as are listed in the List of Reference Signs below.

DETAILED DESCRIPTION OF THE INVENTION

Figure 1:
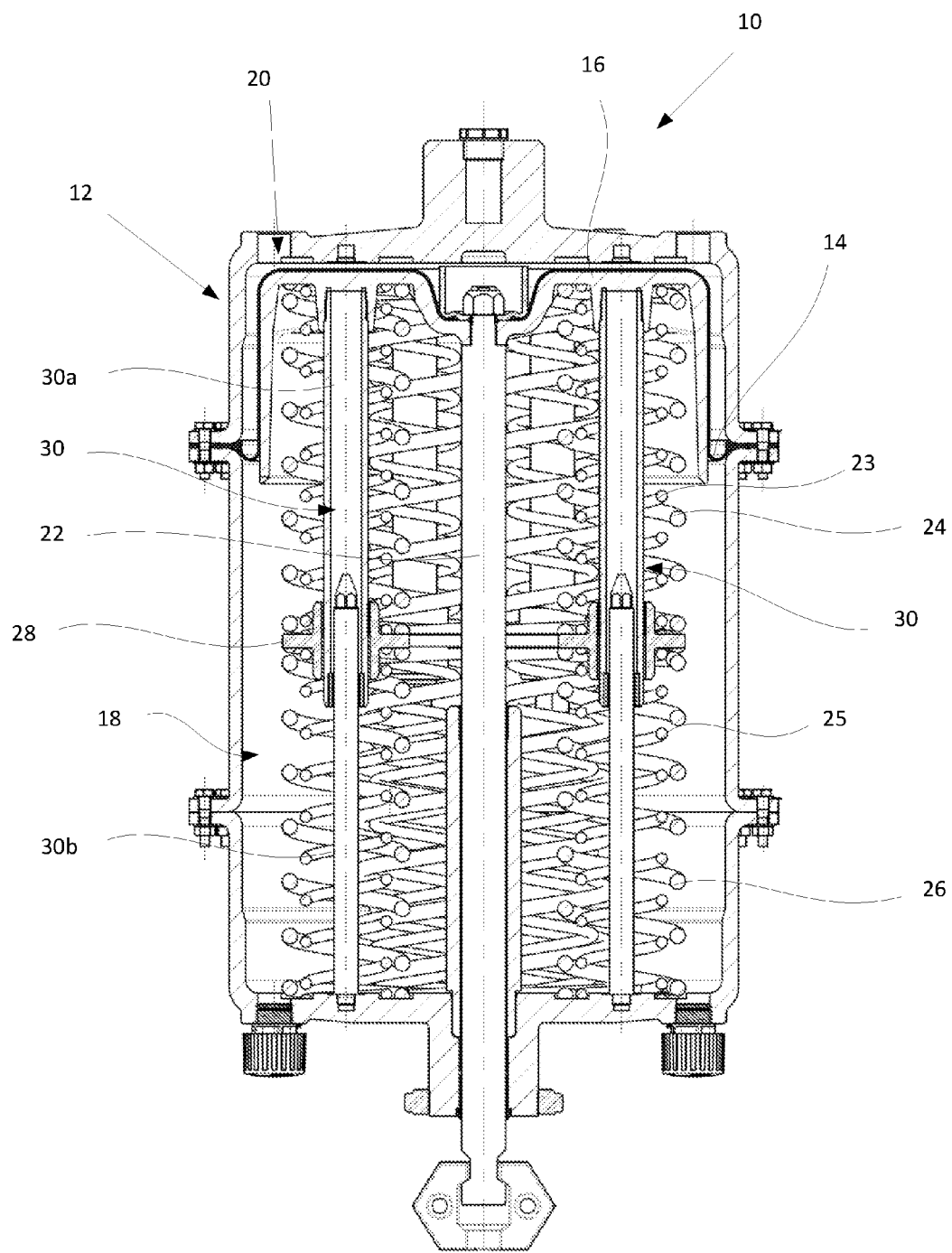
FIG. 1 is a sectional view of a diaphragm actuator having a telescopic guide.

As seen in FIG. 1, the diaphragm actuator 10 of the present invention comprises an actuator housing 12 as well as a diaphragm 14 comprising a diaphragm disk 16. Diaphragm 14 acts to separate a spring chamber 18 from a pressure chamber 20. Connected to diaphragm 14 is a valve stem 22 which adjusts a valve opening by moving diaphragm 14. Springs 24, 26 are provided for setting an unpressurized initial state. Springs 24, 26 are arranged in series. Additional springs 23, 25 are connected in parallel to springs 24, 26. It is possible to connect additional springs in parallel and/or in series. Between springs 23, 24, 25, 26 a spring seat element 28 is provided which is linearly guided by telescopic rods 30. Each telescopic rod 30 comprises a first part such as a tubular element 30a and a second part such as a telescopic element 30b which is slidingly guided within said tubular element 30b (see FIG. 2). The other telescopic rods 30 are of a similar structure. Telescopic rods 30 act as an anti-twist protection between diaphragm disk 16 and actuator housing 12. A plurality of telescopic rods 30 and guide rods 60 may be distributed around the circumference, see FIG. 3 and FIG. 1. It is also possible to provide a diaphragm actuator 10, 42 exclusively with telescopic rods 30 or with guide rods 60.

Spring seat element 28 is guided along the tubular elements 30a by means of plain bearings, e.g., a sliding bush. In such embodiments, the spring seat element (28, 58) is connected to a linear guiding element (30, 60) via a sliding bush. Other types of guides, for example circulating ball bearings guides, may also be used. This is described in more detail with reference to FIG. 2.

Owing to the inventive arrangement comprising the linearly guided spring seat element 28, springs 23, 24, 25, 26 may be relatively short in length with respect to their outer diameter, which reduces any buckling of springs 23, 24, 25, 26 along the same total travel path.

Telescopic rods 30 connect actuator housing 12 to diaphragm disk 16. This results in an extensive anti-twist protection of diaphragm disk 16. Springs 23, 24, 25, 26 are mounted coaxially relative to telescopic rod 30.

Figure 2:
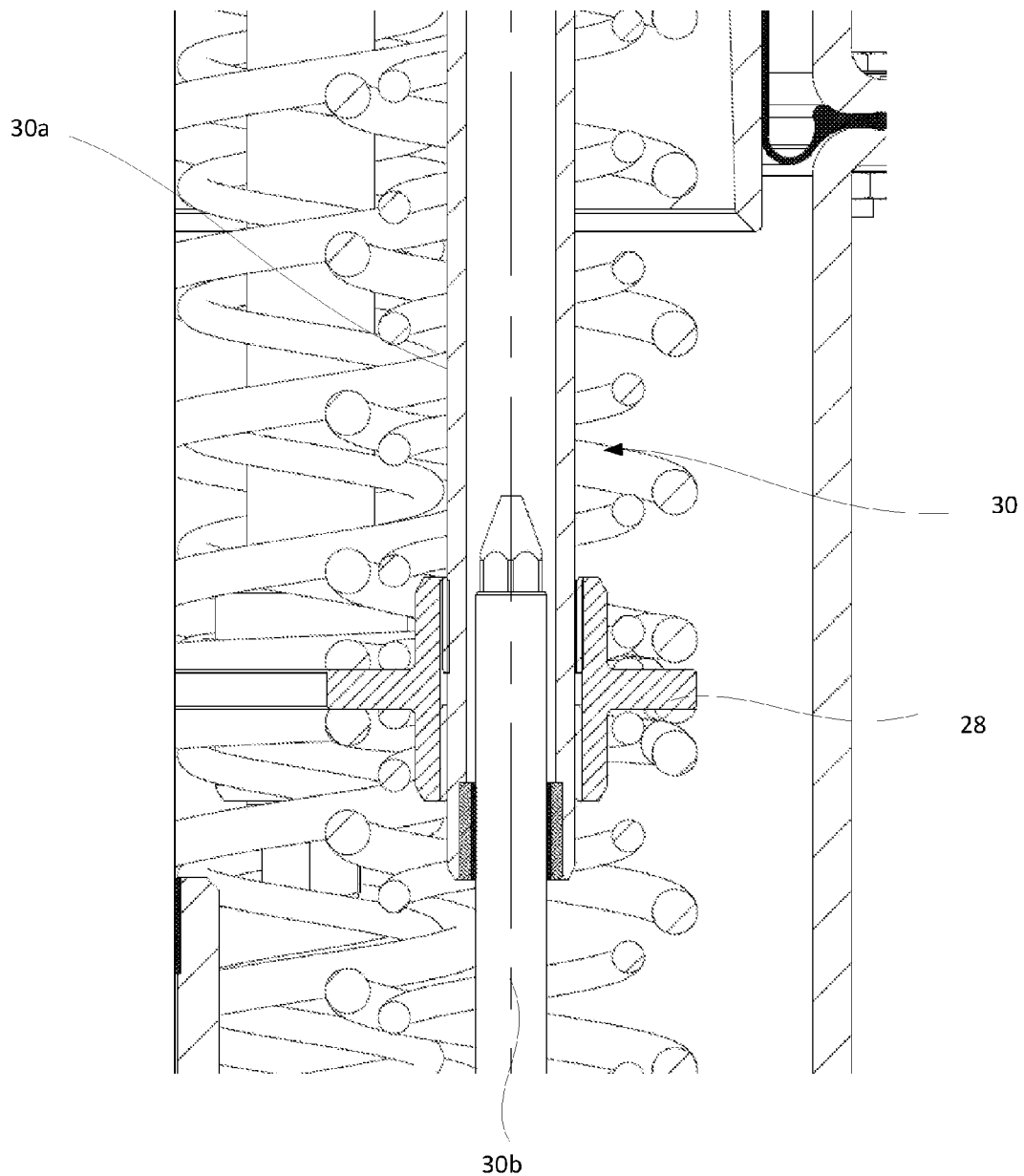
FIG. 2 is a detailed sectional view of a plain bearing of FIG. 1.

FIG. 2 is an enlarged view of the transition from tubular element 30a, telescopic element 30b and plain bearing of spring seat element 28 with respect to tubular element 30a. More specifically, the respective plain bearings are provided in the form of plastic bearings. An inner surface of such a bearing is shown in FIG. 2 bearing on an outer surface of the tubular element 30a. Thus, the spring seat element 28 may be connected to the first part 30a of the telescopic rod 30 as shown via a bearing such as a sliding bush, with the second part 30b of the telescopic rod 30 being adapted to be slidingly inserted in the first part 30a.

Figure 3:
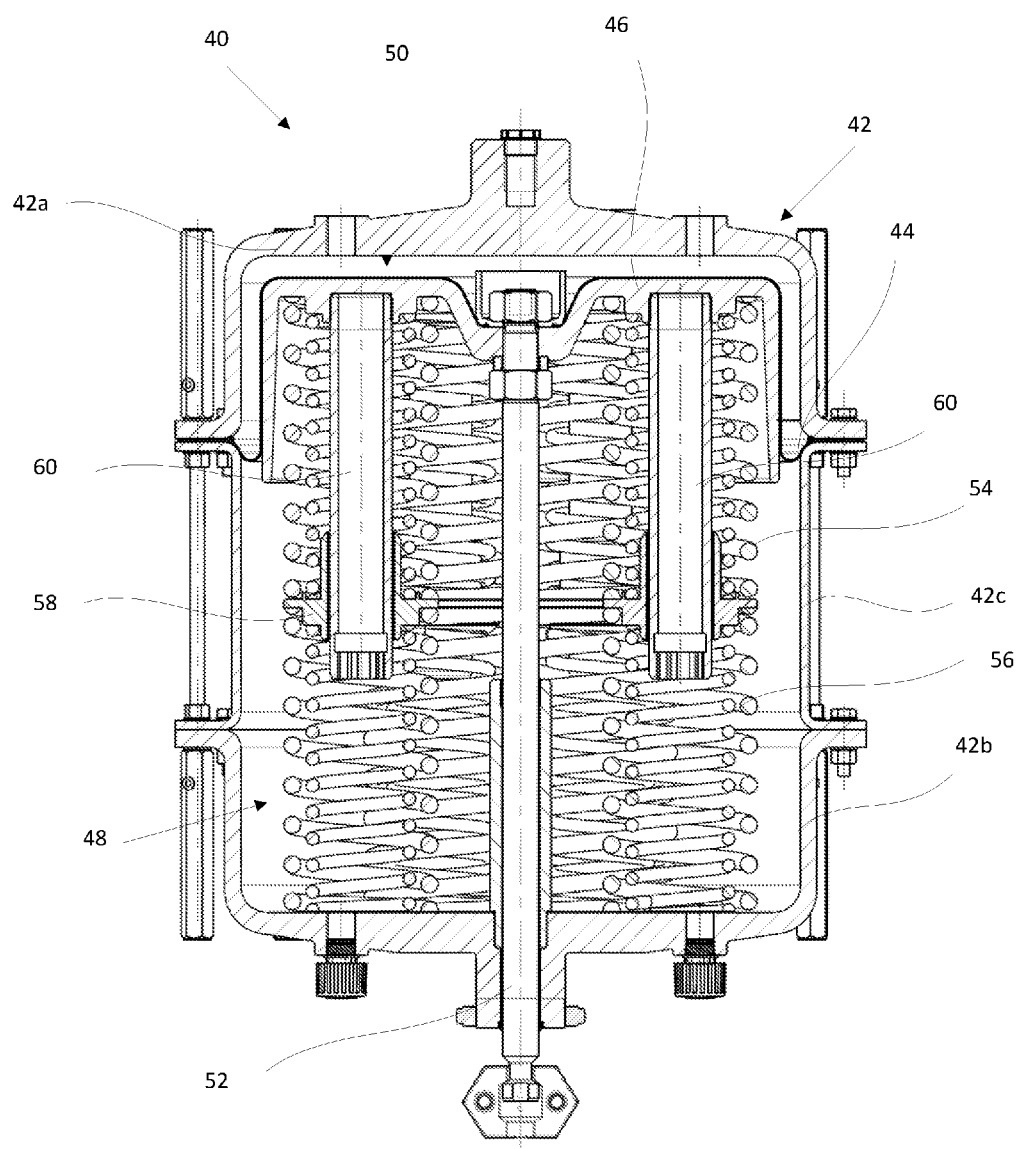
FIG. 3 is a sectional view of a diaphragm actuator having guide rods.

FIG. 3 is a view of a diaphragm actuator 40 according to the invention, comprising an actuator housing 42, as well as a diaphragm 44 comprising a diaphragm disk 46. Diaphragm 44 separates spring chamber 48 from pressure chamber 50. Connected to diaphragm 44 is a valve stem 52 which is moved by diaphragm 44 so as to adjust a valve opening. Amongst other things, springs 54, 56 are provided for adjusting an unpressurized initial state. Springs 54, 56 are arranged in series. A spring seat element 58 is provided between springs 54, 56. Spring seat elements 58 are each linearly guided by a respective guide rod 60. Guide rods 60 are mounted on diaphragm disk 46, and guide rods 60 are shorter in axial length than the axial distance from diaphragm 46 to the opposite surface of the spring chamber in an unpressurized state thereof. As also shown by the springs 24, 25 in FIG. 2, the springs 54, 56 being arranged in series with the spring seat elements in between together rest against the diaphragm disk (16, 46) and the actuator housing (12, 42), with the diaphragm disk (16, 46) connected to the valve stem (22, 52) for actuating the valve body when the pressure chamber is pressurized.

Mounting guide rods 60 on one side only, as in FIG. 3, has the advantage that diaphragm actuator 40 can thus be removed more easily.

Moreover, actuator housing 42 includes a top part 42a, a bottom part 42b and an intermediate part 42c. The axial extensions of top part 42a and bottom part 42b have been adapted to the lengths of springs 54 so as to allow operation even without the presence of any springs 56 arranged in series with respect to springs 54, by removing intermediate part 42c and guide rods 60 as well as spring seat element 58. This allows the diaphragm actuator 40 to be used for variable and modular applications.

LIST OF REFERENCE SIGNS 10 diaphragm actuator
12 actuator housing 14 diaphragm
16 diaphragm disk
18 spring chamber
20 pressure chamber
22 valve stem
23 inner springs
24 springs
25 inner springs
26 springs
28 spring seat element
30 telescopic rods
30a tubular element
30b telescopic element
40 diaphragm actuator
42 actuator housing
42a top part
42b bottom part
42c intermediate part
44 diaphragm
46 diaphragm disk
48 spring chamber
50 pressure chamber
54 springs
56 springs
58 spring seat element
60 guide rods

The invention claimed is:

1. A diaphragm actuator for a control valve, comprising an actuator housing in which a diaphragm including a diaphragm disk is sealingly fitted in the actuator housing, thus forming a pressure chamber, with the diaphragm disk connected to a valve stem for actuating the control valve in a direction along an axis of the valve stem, with at least one spring seat element linearly guided in the axial direction by at least two linear guiding elements disposed equally spaced from the axis of the valve stem, wherein each linear guiding element has at least two springs associated therewith disposed the one after the other in the axial direction and provided between the actuator housing and the diaphragm disk, with the at least one spring seat element provided between the at least two springs, wherein the spring seat element is in the form of a ring element, with the valve stem projecting through a central opening provided in the ring element.

2. The diaphragm actuator as claimed in claim 1, wherein one or more of the at least two linear guiding elements is attached to the actuator housing, the diaphragm disk, or both.

3. The diaphragm actuator as claimed in claim 1, wherein more than one linear guiding element of the at least two linear guiding elements comprises a telescopic rod.

4. The diaphragm actuator as claimed in claim 1, wherein the spring seat element comprises a plurality of spring seat elements each assigned to a corresponding linear guiding element of the at least two linear guiding elements.

5. The diaphragm actuator as claimed in claim 1 wherein one or more of the at least one spring seat element is connected to a corresponding at least one linear guiding element of the at least two linear guiding elements via a sliding bush.

6. The diaphragm actuator as claimed in claim 1 wherein the at least one spring seat element is connected to a first part of a linear guiding element comprising a telescopic rod via a sliding bush, with a second part of said telescopic rod being adapted to be slidingly inserted in said first part.

7. A diaphragm actuator for a control valve, comprising an actuator housing in which a diaphragm including a diaphragm disk is sealingly fitted in the actuator housing, thus forming a pressure chamber, with the diaphragm disk connected to a valve stem for actuating the control valve in a direction along an axis of the valve stem, with at least one spring seat element linearly guided in the axial direction by at least two linear guiding elements disposed equally spaced from the axis of the valve stem, wherein each linear guiding element has at least two springs associated therewith disposed the one after the other in the axial direction and provided between the actuator housing and the diaphragm disk, with the at least one spring seat element provided between the at least two springs, wherein the actuator housing comprises a top part and a bottom part, which parts have together been adjusted in their extension to correspond to the length of a first spring of the at least two springs, with an intermediate part being moreover provided whose axial extension corresponds to the sum of the lengths of at least one second spring of the at least two springs arranged in series relative to said first spring.

8. The diaphragm actuator as claimed in claim 7, wherein the more than one of the at least two linear guiding elements are attached to both the actuator housing and to the diaphragm disk.

9. The diaphragm actuator as claimed in claim 7, wherein one or more of the at least two linear guiding elements is attached to the actuator housing, the diaphragm disk, or both.

10. The diaphragm actuator as claimed in claim 7, wherein more than one linear guiding element of the at least two linear guiding elements comprises a telescopic rod.

11. The diaphragm actuator as claimed in claim 7, wherein the spring seat element comprises a plurality of spring seat elements each assigned to a corresponding linear guiding element of the at least two linear guiding elements.

12. The diaphragm actuator as claimed in claim 7, wherein one or more of the at least one spring seat element is connected to a corresponding at least one linear guiding element of the at least two linear guiding elements via a sliding bush.

13. The diaphragm actuator as claimed in claim 7 wherein the at least one spring seat element is connected to a first part of a linear guiding element comprising a telescopic rod via a sliding bush, with a second part of said telescopic rod being adapted to be slidingly inserted in said first part.

* * * * *